United States Patent
Ramani et al.

(10) Patent No.: US 10,963,289 B2
(45) Date of Patent: **\*Mar. 30, 2021**

(54) STORAGE VIRTUAL MACHINE RELOCATION

(71) Applicant: NetApp Inc., Sunnyvale, CA (US)

(72) Inventors: Balaji Ramani, Bangalore (IN); Kazunobu Nishime, Milpitas, CA (US); Pankti Vinay Majmudar, Sunnyvale, CA (US); Prachi Bapurao Deshmukh, San Jose, CA (US); Susan M. Coatney, Cupertino, CA (US); Vijay Singh, San Jose, CA (US)

(73) Assignee: NetApp Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,846

(22) Filed: Jun. 28, 2019

(65) Prior Publication Data

US 2019/0324787 A1 Oct. 24, 2019

Related U.S. Application Data

(63) Continuation of application No. 15/902,510, filed on Feb. 22, 2018, now Pat. No. 10,346,194, which is a
(Continued)

(51) Int. Cl.
*G06F 9/455* (2018.01)
*G06F 3/06* (2006.01)
(Continued)

(52) U.S. Cl.
CPC .......... *G06F 9/45558* (2013.01); *G06F 3/065* (2013.01); *G06F 3/067* (2013.01);
(Continued)

(58) Field of Classification Search
CPC ...... G06F 3/0619; G06F 3/0647; G06F 3/065; G06F 3/067; G06F 11/14; G06F 11/16;
(Continued)

(56) References Cited

U.S. PATENT DOCUMENTS 7,389,393 B1 6/2008 Karr et al.
8,667,490 B1 \* 3/2014 van der Goot ....... G06F 9/4856
718/1

(Continued)

*Primary Examiner* — Doon Y Chow
*Assistant Examiner* — Timothy P Duncan
(74) *Attorney, Agent, or Firm* — Cooper Legal Group, LLC

(57) ABSTRACT

One or more techniques and/or devices are provided for storage virtual machine relocation (e.g., ownership change) between storage clusters. For example, operational statistics of a first storage cluster and a second storage cluster may be evaluated to identify a set of load balancing metrics. Ownership of one or more storage aggregates and/or one or more storage virtual machines may be changed (e.g., permanently changed for load balancing purposes or temporarily changed for disaster recovery purposes) between the first storage cluster and the second storage cluster utilizing zero-copy ownership change operations based upon the set of load balancing metrics. For example, if the first storage cluster is experiencing a relatively heavier load of client I/O operations and the second storage cluster has available resources, ownership of a storage aggregate and a storage virtual machine may be switched from the first storage cluster to the second storage cluster for load balancing.

20 Claims, 14 Drawing Sheets

Related U.S. Application Data continuation of application No. 14/883,838, filed on Oct. 15, 2015, now Pat. No. 9,940,154.

(51) Int. Cl.
| | |
|---|---|
| *G06F 11/14* | (2006.01) |
| *G06F 11/30* | (2006.01) |
| *G06F 11/16* | (2006.01) |
| *G06F 11/34* | (2006.01) |

(52) U.S. Cl.
CPC .......... *G06F 3/0619* (2013.01); *G06F 3/0647* (2013.01); *G06F 11/14* (2013.01); *G06F 11/16* (2013.01); *G06F 11/3034* (2013.01); *G06F 11/3433* (2013.01); *G06F 2009/4557* (2013.01); *G06F 2009/45575* (2013.01); *G06F 2009/45583* (2013.01); *G06F 2201/815* (2013.01)

(58) Field of Classification Search
CPC ............. G06F 11/3034; G06F 11/3433; G06F 2009/4557; G06F 2009/45575; G06F 2009/45583; G06F 2201/815
See application file for complete search history.

(56) References Cited

U.S. PATENT DOCUMENTS

| | | | |
|---|---|---|---|
| 8,959,173 | B1* | 2/2015 | Robidoux ............. G06F 3/0619 709/216 |
| 9,348,627 | B1* | 5/2016 | Palekar ............... G06F 9/45558 |
| 9,454,326 | B1 | 9/2016 | Bono et al. |
| 2005/0193245 | A1 | 9/2005 | Hayden et al. |
| 2008/0189468 | A1* | 8/2008 | Schmidt .............. G06F 11/2046 711/6 |
| 2011/0231602 | A1* | 9/2011 | Woods .................... G06F 3/067 711/112 |
| 2012/0310883 | A1 | 12/2012 | Akirav et al. |
| 2013/0318297 | A1 | 11/2013 | Jibbe et al. |
| 2014/0047263 | A1 | 2/2014 | Coatney et al. |
| 2015/0134929 | A1 | 5/2015 | Anderson et al. |
| 2015/0169415 | A1* | 6/2015 | Hildebrand ........... G06F 3/0617 714/4.5 |
| 2015/0331766 | A1* | 11/2015 | Sarfare ............... H04L 67/1097 714/4.11 |
| 2016/0139943 | A1 | 5/2016 | Bezbaruah et al. |
| 2016/0162209 | A1 | 6/2016 | Calderone et al. |
| 2016/0239350 | A1* | 8/2016 | Kamawat ............. G06F 9/5088 |

* cited by examiner

STORAGE VIRTUAL MACHINE RELOCATION

RELATED APPLICATIONS

This application claims priority to and is a continuation of U.S. application Ser. No. 15/902,510 filed on Feb. 22, 2018, now allowed, titled "STORAGE VIRTUAL MACHINE RELOCATION," which claims priority to and is a continuation of U.S. Pat. No. 9,940,154 filed on Oct. 15, 2015, now allowed, titled "STORAGE VIRTUAL MACHINE RELOCATION," which are incorporated herein by reference.

BACKGROUND

A storage network environment may comprise one or more storage clusters of storage controllers (e.g., nodes) configured to provide clients with access to user data stored within storage devices. For example, a first storage cluster may comprise a first storage controller hosting a first storage virtual machine (e.g., a virtual server) configured to provide clients with access to user data stored, through a storage aggregate, across one or more storage devices owned by the first storage cluster. A second storage cluster may be configured according to a disaster recovery relationship with respect to the first storage cluster, such that user data (e.g., client I/O operations may be split into two I/O operations that write user data to a local storage device at the first storage cluster and mirror the user data to a remote storage device at the second storage cluster so that two copies of user data are maintained across storage clusters), configuration data (e.g., volume information, a replication policy, a network interface configuration, etc.), and write caching data (e.g., data cached within a non-volatile random-access memory (NVRAM) of the first storage controller before being written/flushed to a storage device during a consistency point) are replicated from the first storage cluster to the second storage cluster and vice versa. In this way, when a disaster occurs at the first storage cluster and clients are unable to access user data within the first storage device because the first storage controller may be unavailable or may have failed from the disaster, a second storage controller of the second storage cluster may provide clients with failover client access (e.g., a temporary switchover of ownership of storage devices and storage virtual machines) to replicated user data that was replicated from the first storage device to a mirrored storage device accessible to the second storage controller. When the first storage cluster recovers from the disaster, the second storage cluster may switch back (e.g., a switch back of ownership of the storage devices and storage virtual machines) to the first storage cluster, such that the first storage controller provides clients with access to user data from the first storage device (e.g., the first storage device may be synchronized with any changes made to user data and/or configuration data within the mirrored storage device during switchover operation by the second storage controller). In this way, user data, cached data, and configuration data may be backed up between storage clusters for disaster recovery.

A storage cluster may locally host multiple local storage virtual machines that are actively providing clients with access to user data of the storage cluster. The storage virtual machines are replicated to a remote storage cluster, such that replicated storage virtual machines at the remote storage cluster are dormant until a switchover occurs from the storage cluster to the remote storage cluster due to a failure of the storage cluster. The remote storage cluster may locally host virtual storage machines that are actively providing clients with access to user data of the remote storage cluster. Such storage virtual machines are replicated to the storage cluster, such that replicated storage virtual machines at the storage cluster are dormant until a switchover occurs from the remote storage cluster to the storage cluster due to a failure of the remote storage cluster. Unfortunately, load balancing technology may not exist for balancing workload between storage clusters of a storage network environment. Thus, if the storage cluster experiences a relatively higher load than the remote storage cluster, clients of the storage cluster may experience increased latency and/or other performance issues.

DETAILED DESCRIPTION

Figure 1:
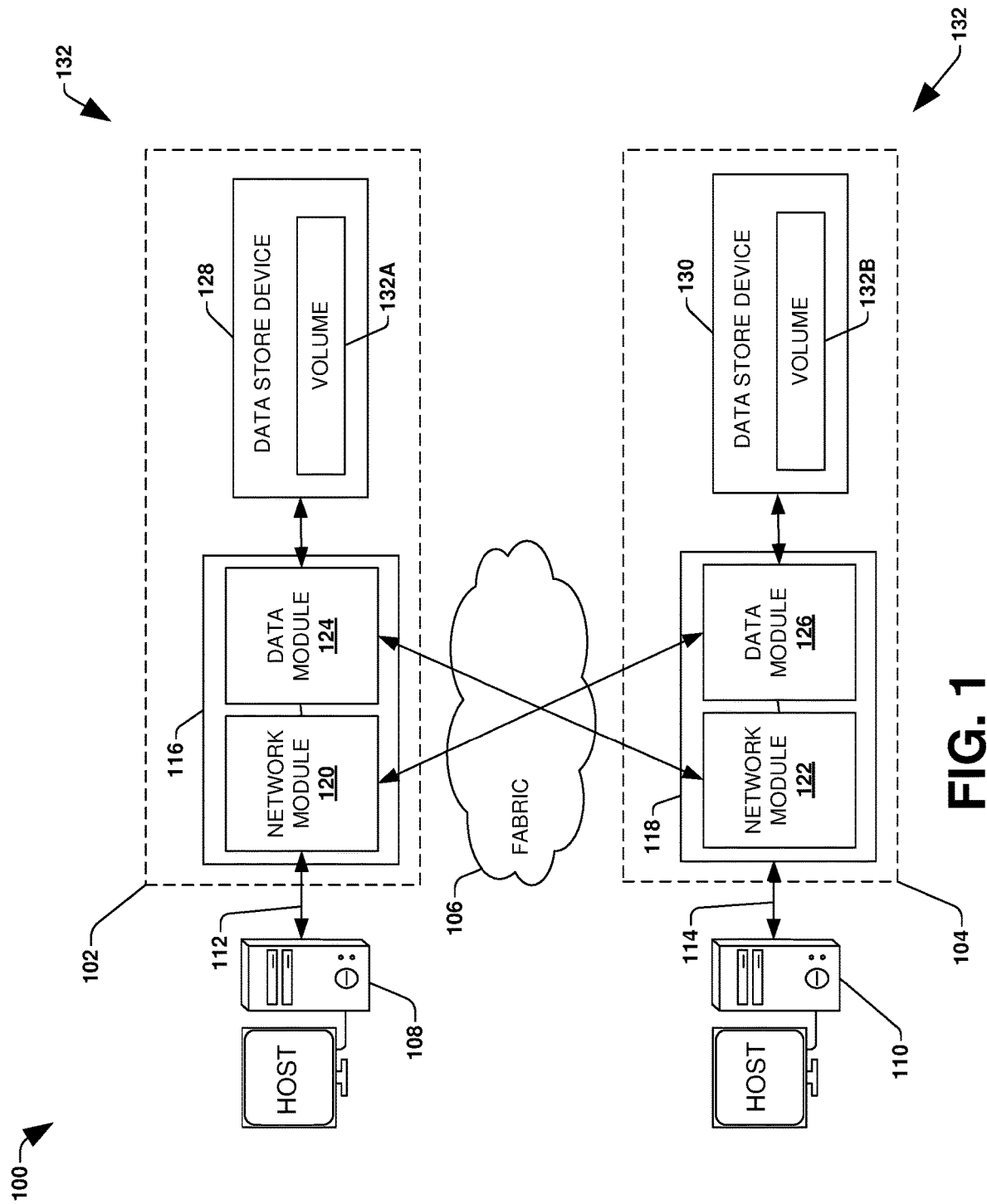
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or devices for storage virtual machine relocation (e.g., a change in ownership) between storage clusters are provided. Operational statistics (e.g., a number of client I/O requests, a current latency of processing client I/O requests, a latency of performing backup and replication functionality, an amount of over-utilized or underutilized resources, etc.) of a first storage cluster and a second storage cluster are evaluated to identify a set of load balancing metrics. For example, the set of load balancing metrics may indicate that the first storage cluster has a first operational load that is a threshold amount greater than the second storage cluster (e.g., the second storage cluster may have more available resources for processing client I/O request, whereas the first storage cluster may be overburdened with work). Accordingly, ownership of a first storage aggregate may be switched from the first storage cluster to the second storage cluster. Ownership of a storage virtual machine and a replicated storage virtual machine, configured to provide access to user data through the first storage aggregate, may be switched from the first storage cluster to the second storage cluster. The replicated storage virtual machine may be switched into an active state for facilitating client access, from the second storage cluster, to user data stored through the first storage aggregate.

In this way, ownership of storage aggregates and/or storage virtual machines may be changed (e.g., permanently changed for load balancing purposes or temporarily changed at a storage virtual machine granularity for disaster recovery purposes) between the first storage cluster and the second storage cluster, at a storage virtual machine granularity (e.g., merely a selected set of storage virtual machines may be relocated, such as having a change in ownership, based upon the load balancing metrics), utilizing zero-copy ownership change operations (e.g., ownership of the storage aggregate may be changed without copying data from the first storage cluster to the second storage cluster because client I/O operations for the first storage aggregate are already mirrored between a local storage device of the first storage cluster and a remote mirror storage device of the second storage cluster during processing of the client I/O operations) without disrupting client access to user data.

To provide context for storage virtual machine relocation (e.g., a change in ownership) between storage clusters, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that storage virtual machine relocation (e.g., a change in ownership) between storage clusters may be implemented within the clustered network environment 100. For example, a relocation component may be implemented for the node 116 and/or the node 118. The relocation component may be configured to relocate a storage virtual machine between the node 116 and the node 118, where the node 116 is hosted within a first storage cluster and the node 118 is hosted within a second storage cluster. In this way, storage virtual machines may be permanently relocated, at a storage virtual machine granularity, between storage clusters utilizing zero-copy ownership change operations for load balancing without client interruption to user data. It may be appreciated that storage virtual machine relocation may be implemented for and/or between any type of computing environment, and may be transferrable between physical devices (e.g., node 116, node 118, etc.) and/or a cloud computing environment (e.g., remote to the clustered network environment 100).

Figure 2:
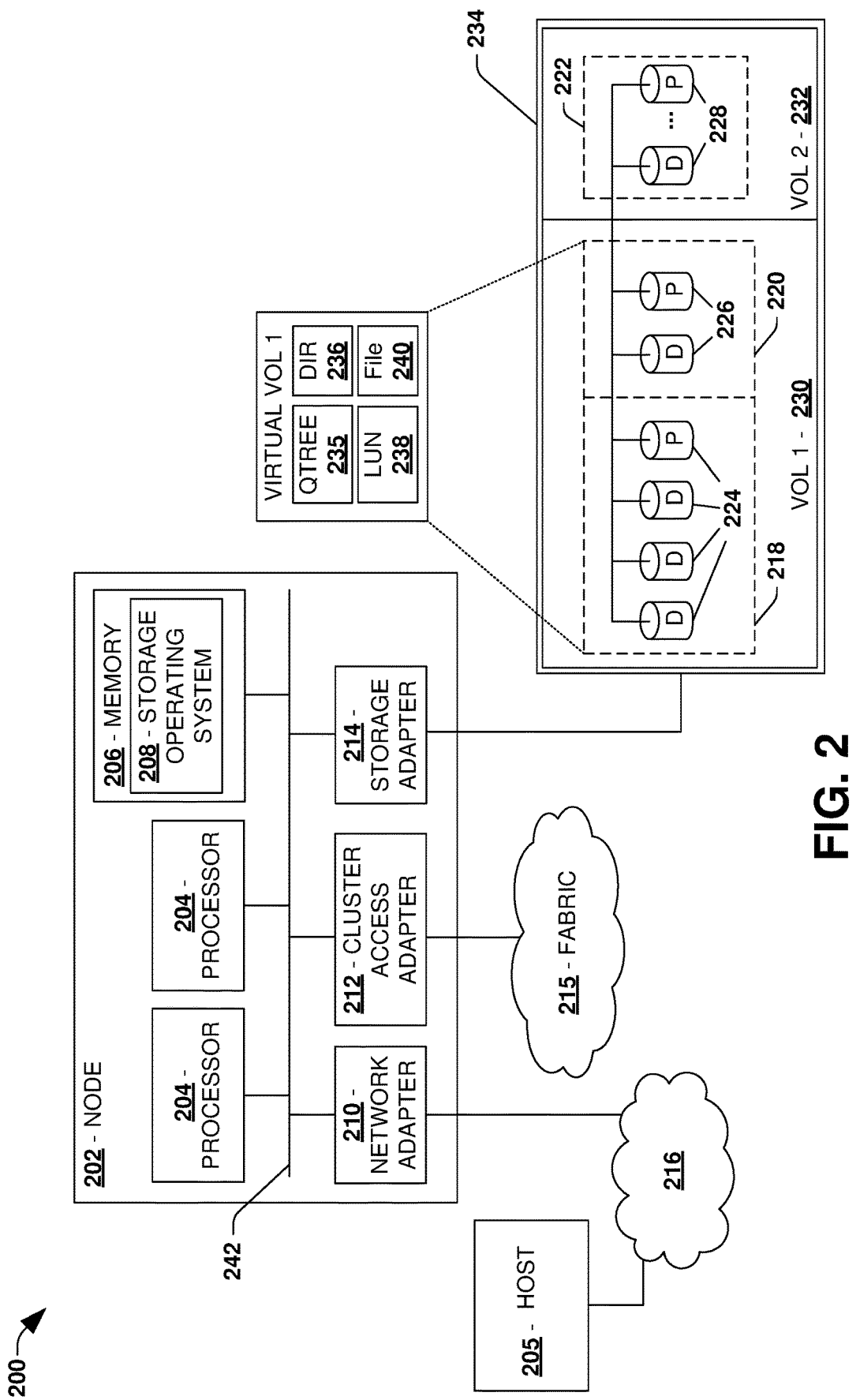
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that storage virtual machine relocation (e.g., change in ownership) between storage clusters may be implemented for the data storage system 200. For example, a relocation component may be implemented for the node 202 of a first storage cluster and a second node of a second storage cluster. The relocation component may be configured to relocate a storage virtual machine between the node 202 and the second node. In this way, storage virtual machines may be permanently relocated, at a storage virtual machine granularity, between storage clusters utilizing zero-copy ownership change operations for load balancing without client interruption to user data. It may be appreciated that storage virtual machine relocation may be implemented for and/or between any type of computing environment, and may be transferrable between physical devices (e.g., node 202, host 205, etc.) and/or a cloud computing environment (e.g., remote to the node 202 and/or the host 205).

Figure 3:
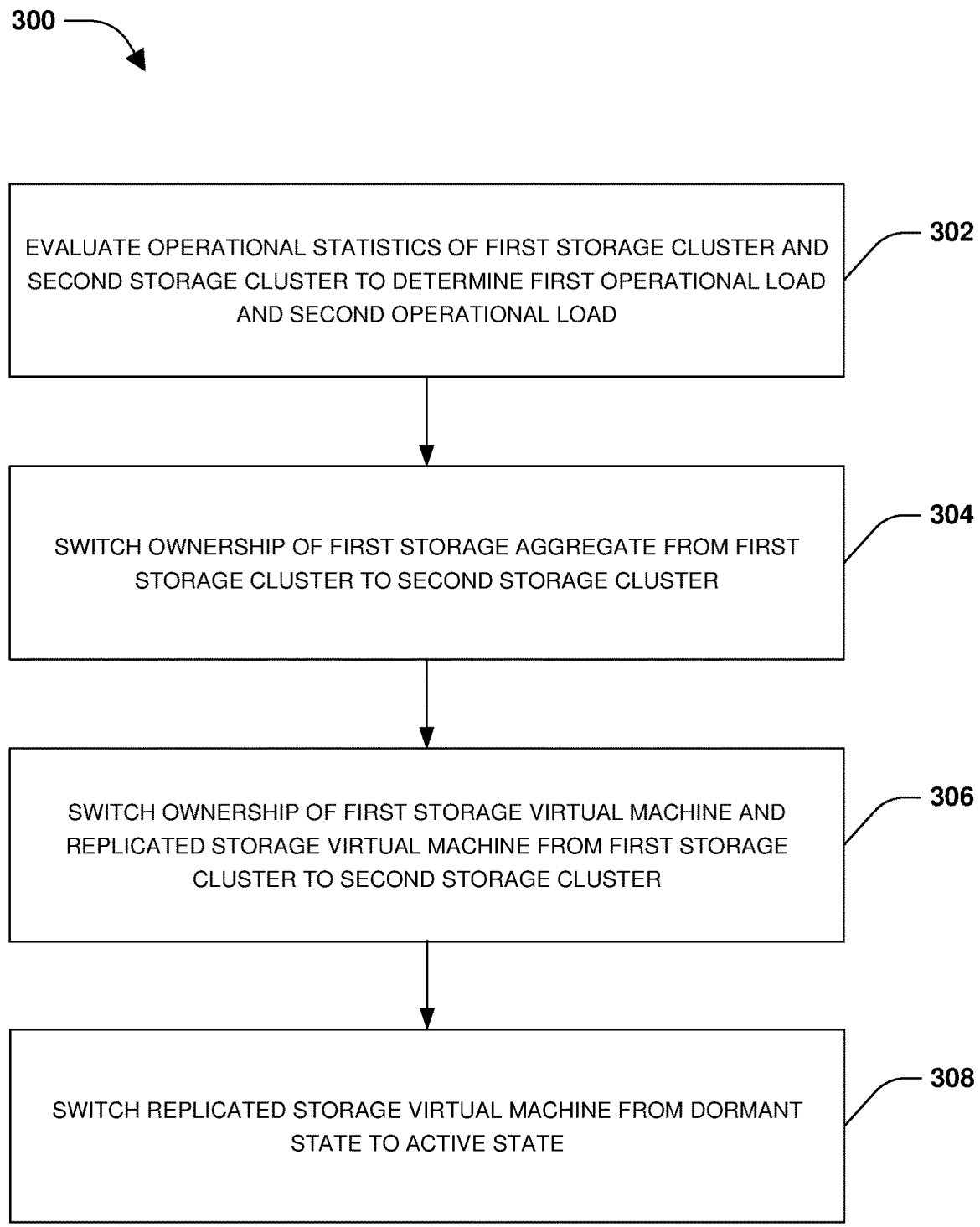
FIG. 3 is a flow chart illustrating an exemplary method of storage virtual machine relocation between storage clusters.

One embodiment of storage virtual machine relocation (e.g., change in ownership) between storage clusters is illustrated by an exemplary method 300 of FIG. 3. At 302, operational statistics of a first storage cluster and a second storage cluster are evaluated to determine that the first storage cluster has a first operational load and that the second storage cluster has a second operational load. An operational load may correspond to a load on a storage cluster in relation to resources of the storage cluster (e.g., a latency of processing client I/O operations, available hardware resources of storage controllers, bandwidth, etc.). The first storage cluster may comprise a first storage virtual machine associated with a first storage aggregate, a second storage virtual machine associated with a second storage aggregate, and/or other storage virtual machines associated with other storage aggregates. The storage virtual machines, hosted by the first storage cluster, may be replicated (configuration data replicated using a configuration replication layer, cached data of an NVRAM replicated using NVRAM mirroring, etc.) to the second storage cluster as replicated storage virtual machines located at the second storage cluster but initially owned by the first storage cluster. The storage virtual machines may be in an active state for facilitating client access to user data within the storage aggregates of the first storage cluster, and the replicated virtual machines may be in a dormant state waiting to provide failover client access to user data in the event the first storage cluster fails or has a disaster.

A storage aggregate may be stored across one or more storage devices according to a data mirroring configuration. A RAID synchronous mirroring solution may be implemented where a client I/O operation to the storage aggregate is split into two operations where data is stored within a local storage device of a local storage cluster by a first operation and a backup mirror of the data is stored within a remote mirror storage device of a remote storage cluster. For example, a write operation to the first storage aggregate may be split into a first operation that stores data of the write operation within a first storage device of the first storage cluster (e.g., during a flush of an NVRAM, within which the data of the write operation may have been cached, of the first storage controller into a local storage device) and within a mirror storage device of the second storage cluster. In this way, data within the first storage aggregate may be stored within the first storage cluster and mirrored to the second storage cluster.

The first operational load may be compared to the second operational load to determine whether the first storage cluster and/or the second storage cluster are overburdened with workloads or have available resources. For example, the first operational load may be determined as being a threshold amount greater than the second operational load, and thus load balancing of workloads from the first storage cluster to the second storage cluster may be beneficial.

Accordingly, ownership of the first storage aggregate may be switched from the first storage cluster to the second storage cluster, at 304. For example, the first storage aggregate may be unmounted. Ownership of a first storage device, associated with the first storage aggregate and maintained at the first storage cluster, may be changed from the first storage cluster to the second storage cluster. In an example, ownership of a mirror storage device, associated with the first storage aggregate as a mirror of the first storage aggregate and maintained at the second storage cluster, may be changed from the first storage cluster to the second storage cluster. The first storage aggregate may be onlined for ownership by the second storage cluster. A zero-copy ownership change operation may be performed to switch the ownership of the first storage aggregate because the mirror storage device, hosted at the second storage cluster, is a backup mirror already comprising replicated data of the first storage device, and thus little to no additional copying of user data to the second storage cluster may be performed, for example. In an example, the second storage cluster may be specified as a non-temporary owner (e.g., a permanent owner) of the first storage aggregate.

At 306, ownership of the first storage virtual machine and the replicated storage virtual machine may be switched from the first storage cluster to the second storage cluster. At 308, the replicated storage virtual machine may be switched to an active state for facilitating client access, from the second storage cluster, to user data stored through the first storage aggregate (e.g., replicated data stored within the mirror storage device). The first storage virtual machine may be switch to a dormant state. In an example, the second storage cluster may be designated as a non-temporary owner (e.g., a permanent owner) of the first storage virtual machine. Non-disruptive client access to data may be maintained through the first storage aggregate during switchover of ownership of the first storage aggregate, the first storage virtual machine, and/or the replicated storage virtual machine from the first storage cluster to the second storage cluster. In this way, ownership of one or more storage aggregates and one or more storage virtual machines may be permanently changed between the first storage cluster and the second storage cluster utilizing zero-copy ownership change operations based upon load balancing metrics associated with the first storage cluster and the second storage cluster without disrupting client access to user data.

In an example, storage virtual machines may be temporarily relocated between storage clusters at a storage virtual machine granularity such as for disaster recovery purposes. For example, the first storage cluster and the second storage cluster may be configured according to a disaster recovery relationship, such that the second storage cluster is configured to provide failover client access to data, replicated from the first storage cluster (e.g., access to data within a mirror storage device, of the second storage cluster, comprising replicated data mirrored from a storage device of the first storage cluster), responsive to a disaster occurring at the first storage cluster. The first storage cluster may comprise a third storage aggregate and a third storage virtual machine. The second storage cluster may comprise a replicated third storage virtual machine that is a replication of the third storage virtual machine.

Responsive to determining that the first storage cluster has experienced the disaster, a temporary switchover of ownership of the third storage aggregate, but not the second storage aggregate, may be performed from the first storage cluster to the second storage cluster based upon the disaster recovery relationship. For example, the first storage cluster may retain ownership of the third storage virtual machine and the replicated storage virtual machine, however, the replicated storage virtual machine may be switched from a dormant state to an active state for providing failover client access to the third storage aggregate temporarily owned by the second storage cluster. In this way, select storage aggregates may be temporarily relocated, at a storage virtual server granularity, for disaster recovery operation.

Responsive to determining that the first storage cluster has recovered to an operational state from the disaster, a switchback of ownership of the third storage aggregate may be performed from the second storage cluster to the first storage cluster. The third replicated storage virtual machine may be switched from the active state to the dormant state. The storage virtual machine may be set to the active state for providing primary client access to data from the third storage aggregate.

FIGS. 4A-4D illustrate examples of a system 400, comprising a relocation component 401, for storage virtual machine relocation (e.g., change in ownership) between storage clusters. The relocation component 401 may be hosted within storage cluster (A) 402, storage cluster (B) 404, or a remote location having network connectivity to the storage cluster (A) 402 and/or the storage cluster (B) 404. The storage cluster (A) 402 may comprise a storage controller (A1) 406, a storage controller (A2) 416, and/or other storage controllers not illustrated. The storage cluster (B) 404 may comprise a storage controller (B1) 418, a storage controller (B2) 426, and/or other storage controllers not illustrated. It may be appreciated that storage controllers and storage devices that are owned by the storage cluster (A) 402 are represented by a dotted fill, while storage controllers and storage devices that are owned by the storage cluster (B) 404 are represented by a slanted line fill.

A storage controller may be configured to provide clients with storage using storage aggregates hosted by storage virtual machines. In an example, the storage controller (A1) 406 may provide clients with storage through a storage aggregate (A1) maintained by a storage virtual machine (A1) 408. The storage aggregate (A1) may comprise a first set of storage devices 430 (e.g., one or more storage devices hosted within the storage cluster (A) 402 and one or more mirrored storage devices hosted within the storage cluster (B) 404, such that a client I/O operation to the storage aggregate (A1) is written to both a storage device hosted within the storage cluster (A) 402 and a corresponding mirrored storage device hosted within the storage cluster (B) 404 for data redundancy and data loss mitigation). In another example, the storage controller (A2) 426 may provide clients with storage through a storage aggregate (A2) maintained by a storage virtual machine (A2) 414. The storage aggregate (A2) may comprise a second set of storage devices 434 (e.g., one or more storage devices hosted within the storage cluster (A) 402 and one or more mirrored storage devices hosted within the storage cluster (B) 404, such that a client I/O operation to the storage aggregate (A2) is written to both a storage device hosted within the storage cluster (A) 402 and a corresponding mirrored storage device hosted within the storage cluster (B) 404 for data redundancy and data loss mitigation).

In another example, the storage controller (B1) 418 may provide clients with storage through a storage aggregate (B1) maintained by a storage virtual machine (B1) 422. The storage aggregate (B1) may comprise a third set of storage devices 432 (e.g., one or more storage devices hosted within the storage cluster (B) 404 and one or more mirrored storage devices hosted within the storage cluster (A) 402, such that a client I/O operation to the storage aggregate (B1) is written to both a storage device hosted within the storage cluster (B) 404 and a corresponding mirrored storage device hosted within the storage cluster (A) 402 for data redundancy and data loss mitigation).

Replicated storage virtual machines, corresponding to replications of storage virtual machines at a different storage cluster, may be maintained at remote storage clusters in order to provide failover access to replicated user data in the event a disaster occurs at a storage cluster. For example, the storage cluster (B) 404 may host a replicated storage virtual machine (A1-DR) 420, corresponding to a replication of the storage virtual machine (A1) 408, and a replicated storage virtual machine (A2-DR) 424 corresponding to a replication of the storage virtual machine (A2) 414, which may provide failover access to replicated user data in the event the storage cluster (A) 402 experiences a disaster. The storage cluster (A) 402 may host a replicated storage virtual machine (B1-DR) 410 corresponding to a replication of the storage virtual machine (B1) 422, which may provide failover access to replicated user data in the event the storage cluster (B) 404 experiences a disaster. Within a pairing of storage virtual machines, merely a single storage virtual machine is active for providing access to user data while the other storage virtual machine is dormant (e.g., the replicated storage virtual machine (A1-DR) 420 is dormant while the storage virtual machine (A1) 408 is actively providing clients with access to user data).

Figure 4A:
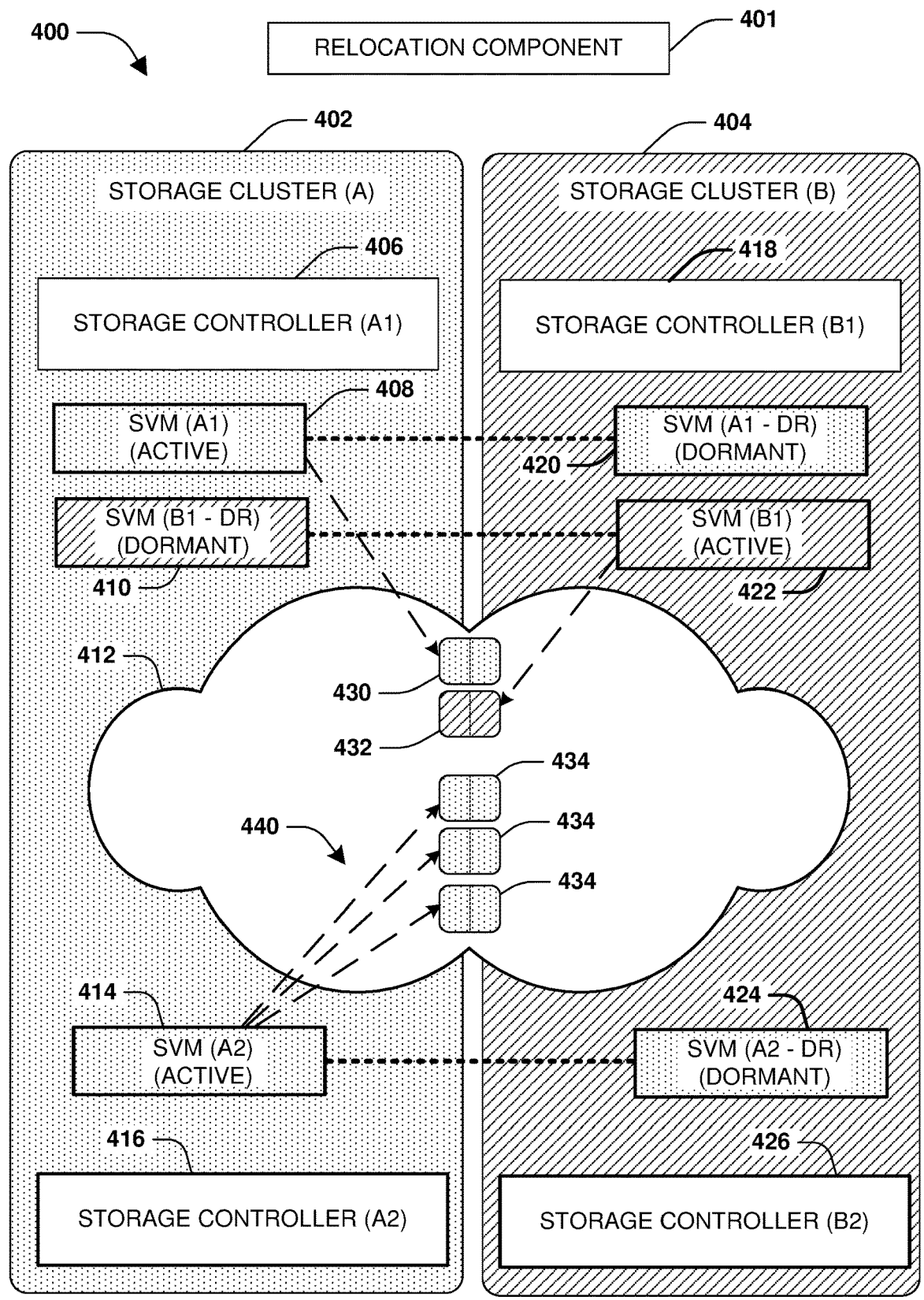
FIG. 4A is a component block diagram illustrating an exemplary system for storage virtual machine relocation between storage clusters, where a storage virtual machine (A2) of a storage cluster (A) is providing clients with access to user data of a storage aggregate (A2).

FIG. 4A illustrates the storage virtual machine (A2) 414 actively serving clients with access to user data of the storage aggregate (A2) stored within the second set of storage devices 434 (e.g., from within storage devices hosted at the storage cluster (A) 402, and where data is replicated to mirrored storage devices hosted at the storage cluster (B) 404) while the storage cluster (A) 402 has ownership 440 of the second set of storage devices 434 and the storage aggregate (A2). The relocation component 401 may evaluate operational statistics of the storage cluster (A) 402 and the storage cluster (B) 404 to determine that an operational load of the storage cluster (A) 402 exceeds an operational load to the storage cluster (B) 404 by a threshold amount (e.g., latency, available resources, bandwidth, a number of clients being served, a number and frequency of client I/O operations, and/or other information may indicate that the storage cluster (B) 404 has more available resources and/or a lighter load than the storage cluster (A) 402). Accordingly, the relocation component 401 may perform a relocation (e.g., a change in ownership) of the storage virtual machine (A2) 414 from the storage cluster (A) 402 to the storage cluster (B) 404 for load balancing.

Figure 4B:
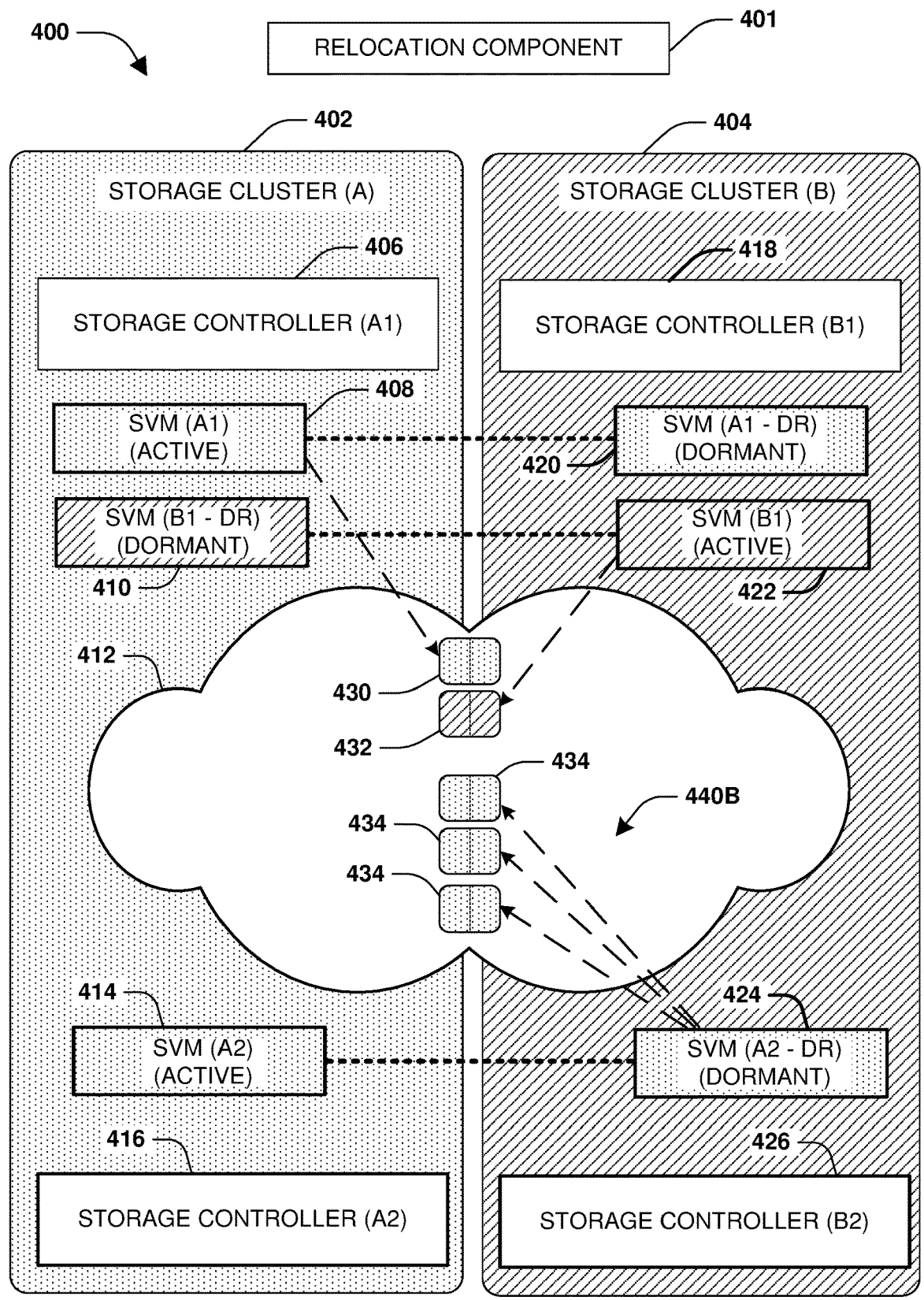
FIG. 4B is a component block diagram illustrating an exemplary system for storage virtual machine relocation between storage clusters, where ownership of a second set of storage devices of a storage aggregate (A2) is switched from a storage cluster (A) to a storage cluster (B).
Figure 4C:
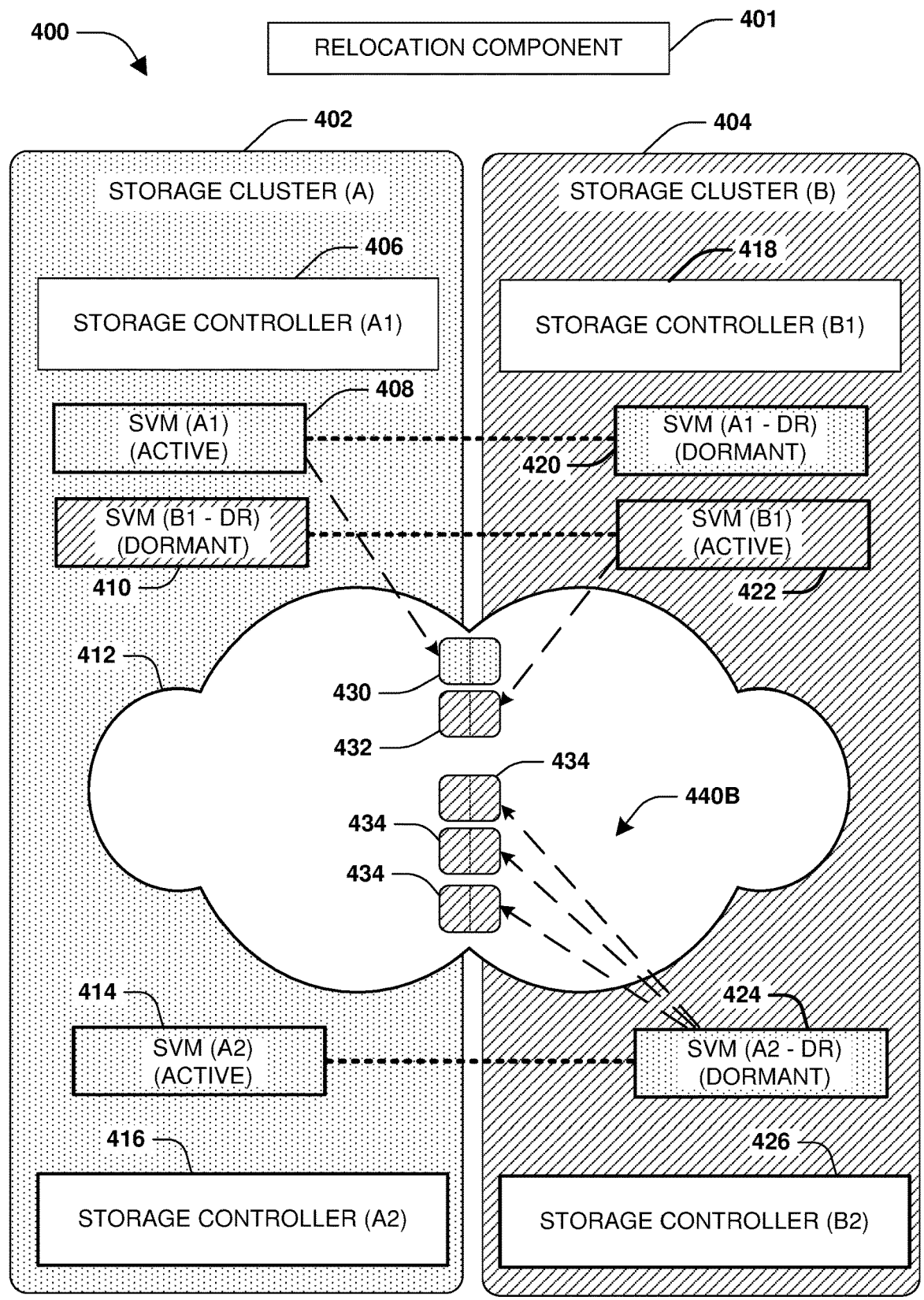
FIG. 4C is a component block diagram illustrating an exemplary system for storage virtual machine relocation between storage clusters, where ownership of a storage aggregate (A2) is switched from a storage cluster (A) to a storage cluster (B).

FIG. 4B illustrates the relocation component 401 performing the relocation by initiating a switch of ownership 440B of the second set of storage devices 434 of the storage aggregate (A2) from the storage cluster (A) 402 to the storage cluster (B) 404. FIG. 4C illustrates the relocation component 401 switching ownership of the storage aggregate (A2) from the storage cluster (A) 402 to the storage cluster (B) 404, which is illustrated by the second set of storage devices 434 having the slanted line fill, as opposed to the dotted fill, to illustrate ownership by the storage cluster (B) 404.

Figure 4D:
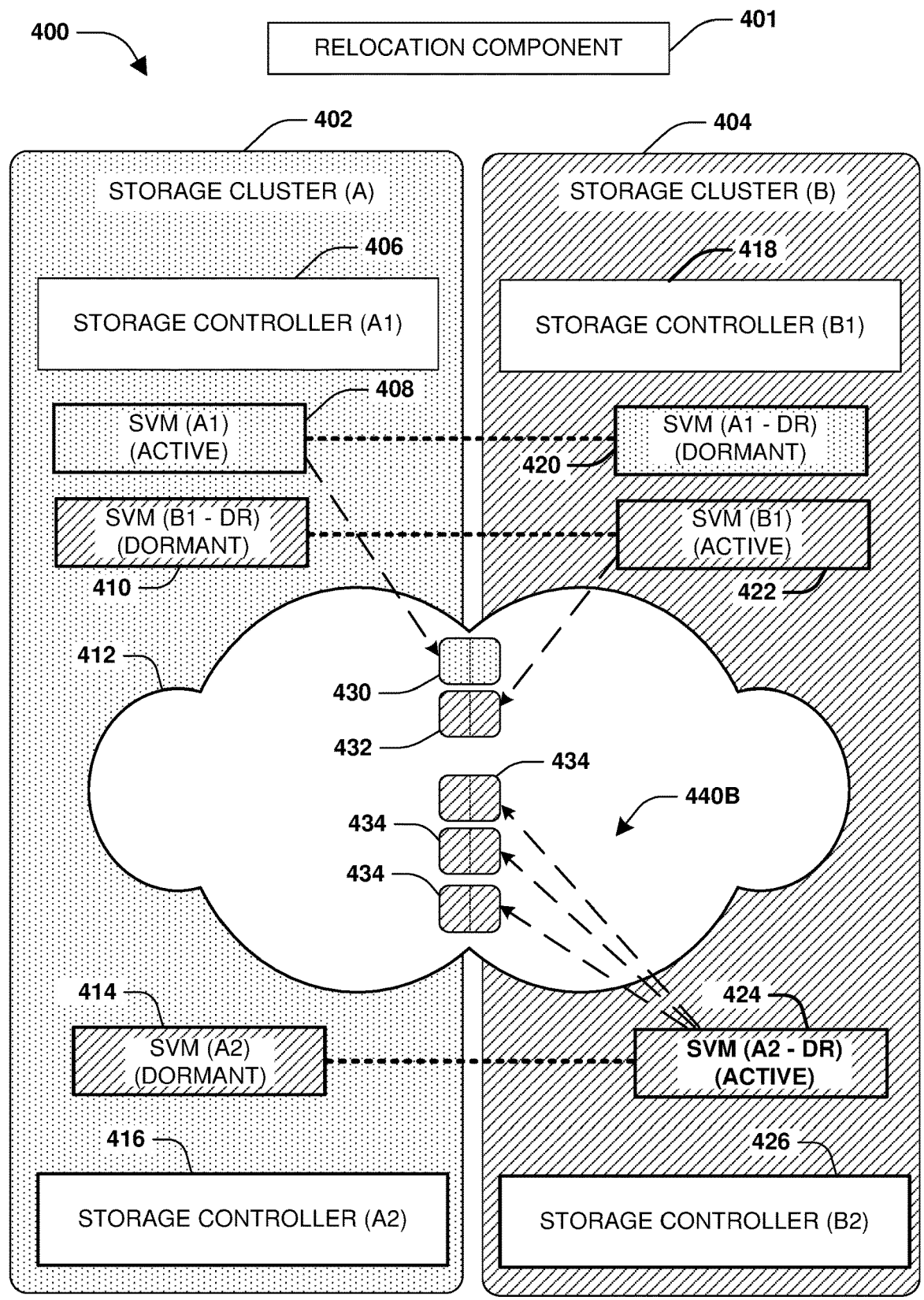
FIG. 4D is a component block diagram illustrating an exemplary system for storage virtual machine relocation between storage clusters, where ownership of a storage virtual machine (A2) and a replicated storage virtual machine (A2-DR) are switched from a storage cluster (A) to a storage cluster (B) for load balancing.

FIG. 4D illustrates the relocation component 401 switching ownership of the storage virtual machine (A2) 414 and the replicated storage virtual machine (A2-DR) 424 from the storage cluster (A) 402 to the storage cluster (B) 404. The relocation component 401 may switch the storage virtual machine 414 into a dormant state and the replicated storage virtual machine (A2-DR) 424 into an active state for facilitating client access, from the storage cluster (B) 404, to user data stored within the storage aggregate (A2) such as data within the second set of storage devices 434 now owned by the storage cluster (B) 404. In this way, load balancing may be achieved between the storage cluster (A) 402 and the storage cluster (B) 404 at a storage virtual machine granularity (e.g., resources of the storage controller (B2) 426 may now be used to host the replicated storage virtual machine (A2-DR) 424 in the active state).

FIGS. 5A-5F illustrate examples of a system 500, comprising a relocation component 501, for temporary storage virtual machine relocation between storage clusters at a storage virtual machine granularity in response to a disaster of a storage cluster. The relocation component 501 may be hosted within storage cluster (A) 502, storage cluster (B) 504, or a remote location having network connectivity to the storage cluster (A) 502 and/or the storage cluster (B) 504. The storage cluster (A) 502 may comprise a storage controller (A1) 506, a storage controller (A2) 516, and/or other storage controllers not illustrated. The storage cluster (B) 504 may comprise a storage controller (B1) 518, a storage controller (B2) 526, and/or other storage controllers not illustrated. It may be appreciated that storage controllers and storage devices that are owned by the storage cluster (A) 502 are represented by a dotted fill, while storage controllers and storage devices that are owned by the storage cluster (B) 504 are represented by a slanted line fill.

A storage controller may be configured to provide clients with storage using storage aggregates hosted by storage virtual machines. In an example, the storage controller (A1) 506 may provide clients with storage through a storage aggregate (A1) maintained by a storage virtual machine (A1) 508. The storage aggregate (A1) may comprise a first set of storage devices 530 (e.g., one or more storage devices hosted within the storage cluster (A) 502 and one or more mirrored storage devices hosted within the storage cluster (B) 504, such that a client I/O operation to the storage aggregate (A1) is written to both a storage device hosted within the storage cluster (A) 502 and a corresponding mirrored storage device hosted within the storage cluster (B) 504 for data redundancy and data loss mitigation). In another example, the storage controller (A2) 526 may provide clients with storage through a storage aggregate (A2) maintained by a storage virtual machine (A2) 514. The storage aggregate (A2) may comprise a second set of storage devices 534 (e.g., one or more storage devices hosted within the storage cluster (A) 502 and one or more mirrored storage devices hosted within the storage cluster (B) 504, such that a client I/O operation to the storage aggregate (A2) is written to both a storage device hosted within the storage cluster (A) 502 and a corresponding mirrored storage device hosted within the storage cluster (B) 504 for data redundancy and data loss mitigation).

In another example, the storage controller (B1) 518 may provide clients with storage through a storage aggregate (B1) maintained by a storage virtual machine (B1) 522. The storage aggregate (B1) may comprise a third set of storage devices 532 (e.g., one or more storage devices hosted within the storage cluster (B) 504 and one or more mirrored storage devices hosted within the storage cluster (A) 502, such that a client I/O operation to the storage aggregate (B1) is written to both a storage device hosted within the storage cluster (B) 504 and a corresponding mirrored storage device hosted within the storage cluster (A) 502 for data redundancy and data loss mitigation).

Replicated storage virtual machines, corresponding to replications of storage virtual machines at a different storage cluster, may be maintained at remote storage clusters in order to provide failover access to replicated user data in the event a disaster occurs at a storage cluster. For example, the storage cluster (B) 504 may host a replicated storage virtual machine (A1-DR) 520, corresponding to a replication of the storage virtual machine (A1) 508, and a replicated storage virtual machine (A2-DR) 524 corresponding to a replication of the storage virtual machine (A2) 514, which may provide failover access to replicated user data in the event the storage cluster (A) 502 experiences a disaster. The storage cluster (A) 502 may host a replicated storage virtual machine (B1-DR) 510 corresponding to a replication of the storage virtual machine (B1) 522, which may provide failover access to replicated user data in the event the storage cluster (B) 504 experiences a disaster.

Figure 5A:
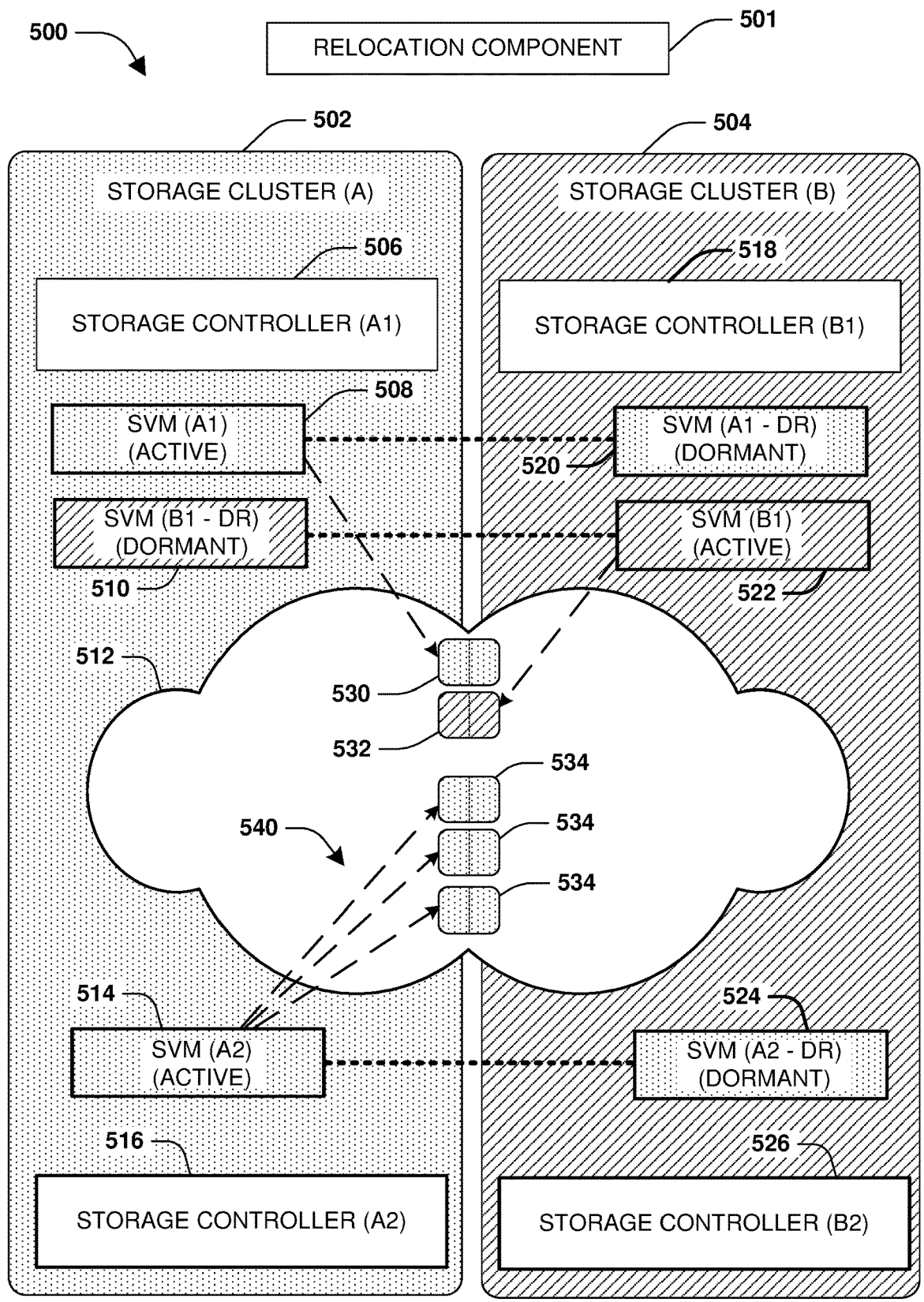
FIG. 5A is a component block diagram illustrating an exemplary system for temporary storage virtual machine relocation between storage clusters at a storage virtual machine granularity in response to a disaster of a storage cluster, where a storage virtual machine (A2) of a storage cluster (A) is providing clients with access to user data of a storage aggregate (A2).

FIG. 5A illustrates the storage virtual machine (A2) 514 actively serving clients with access to user data of the storage aggregate (A2) stored within the second set of storage devices 534 (e.g., from within storage devices hosted at the storage cluster (A) 502, and where data is replicated to mirrored storage devices hosted at the storage cluster (B) 504) while the storage cluster (A) 502 has ownership 540 of the second set of storage devices 534 and the storage aggregate (A2).

Figure 5B:
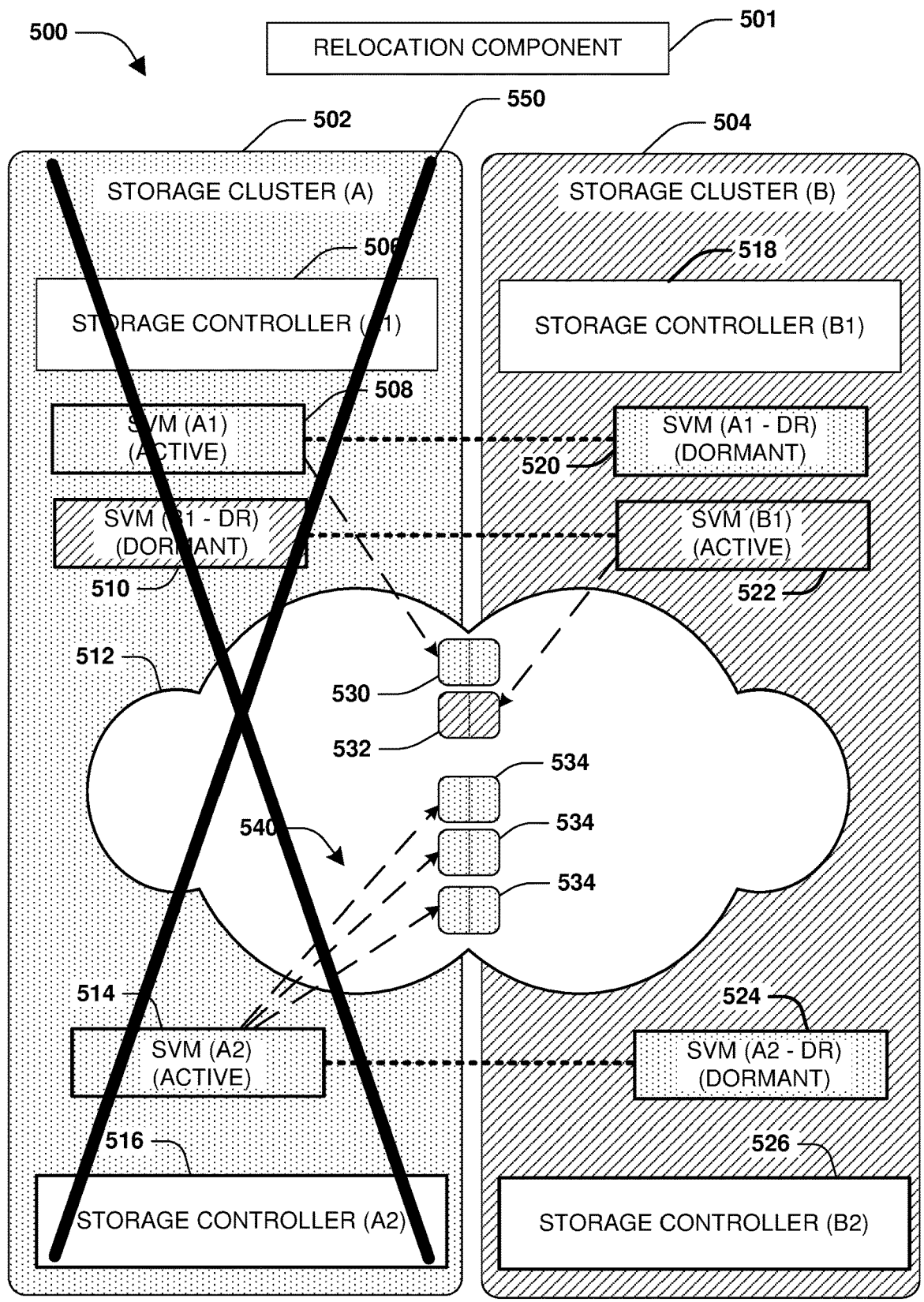
FIG. 5B is a component block diagram illustrating an exemplary system for temporary storage virtual machine relocation between storage clusters at a storage virtual machine granularity in response to a disaster of a storage cluster, where a storage cluster (A) experiences a disaster.
Figure 5C:
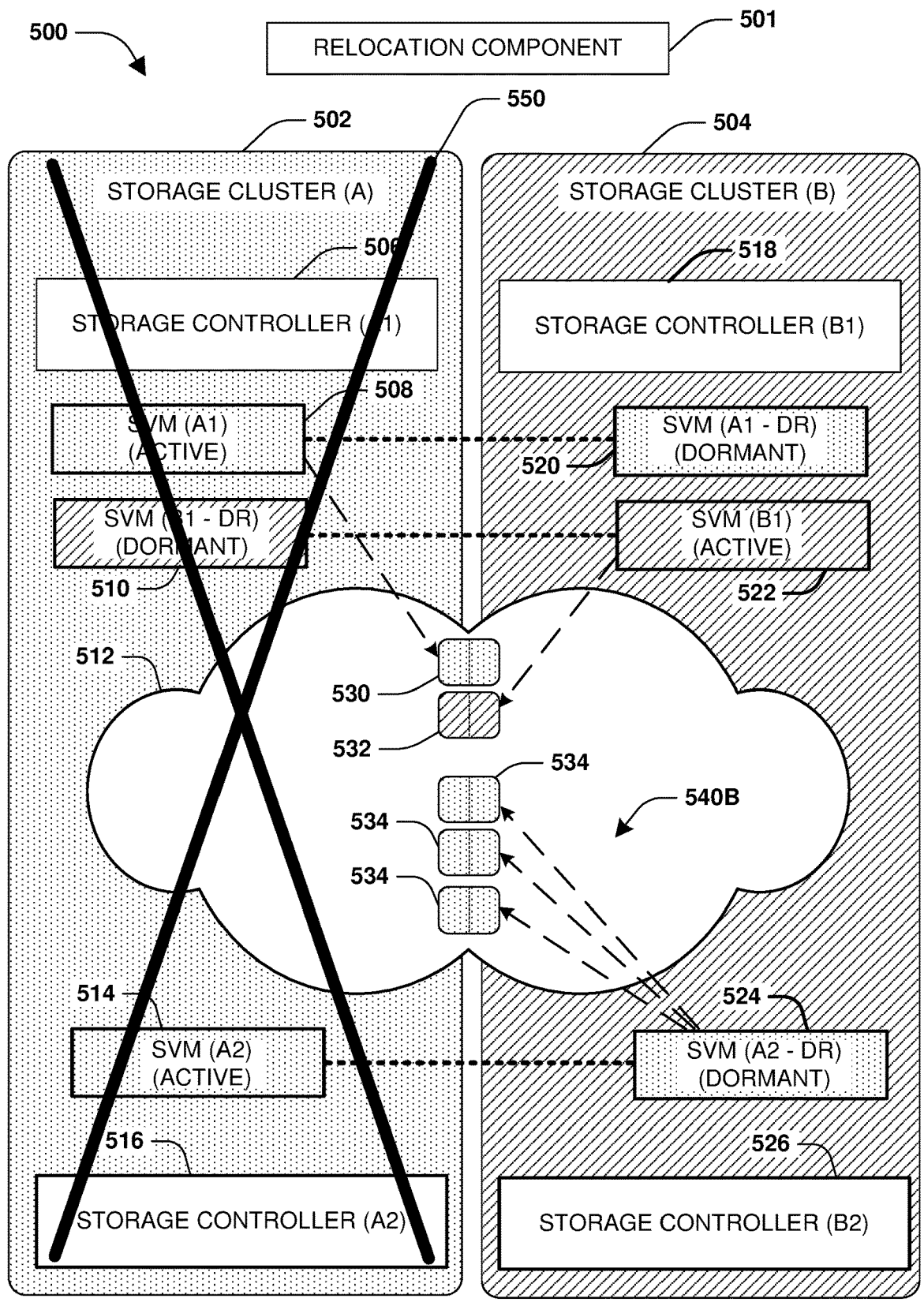
FIG. 5C is a component block diagram illustrating an exemplary system for temporary storage virtual machine relocation between storage clusters at a storage virtual machine granularity in response to a disaster of a storage cluster, where ownership of a second set of storage devices of a storage aggregate (A2) is switched from a storage cluster (A) to a storage cluster (B).
Figure 5D:
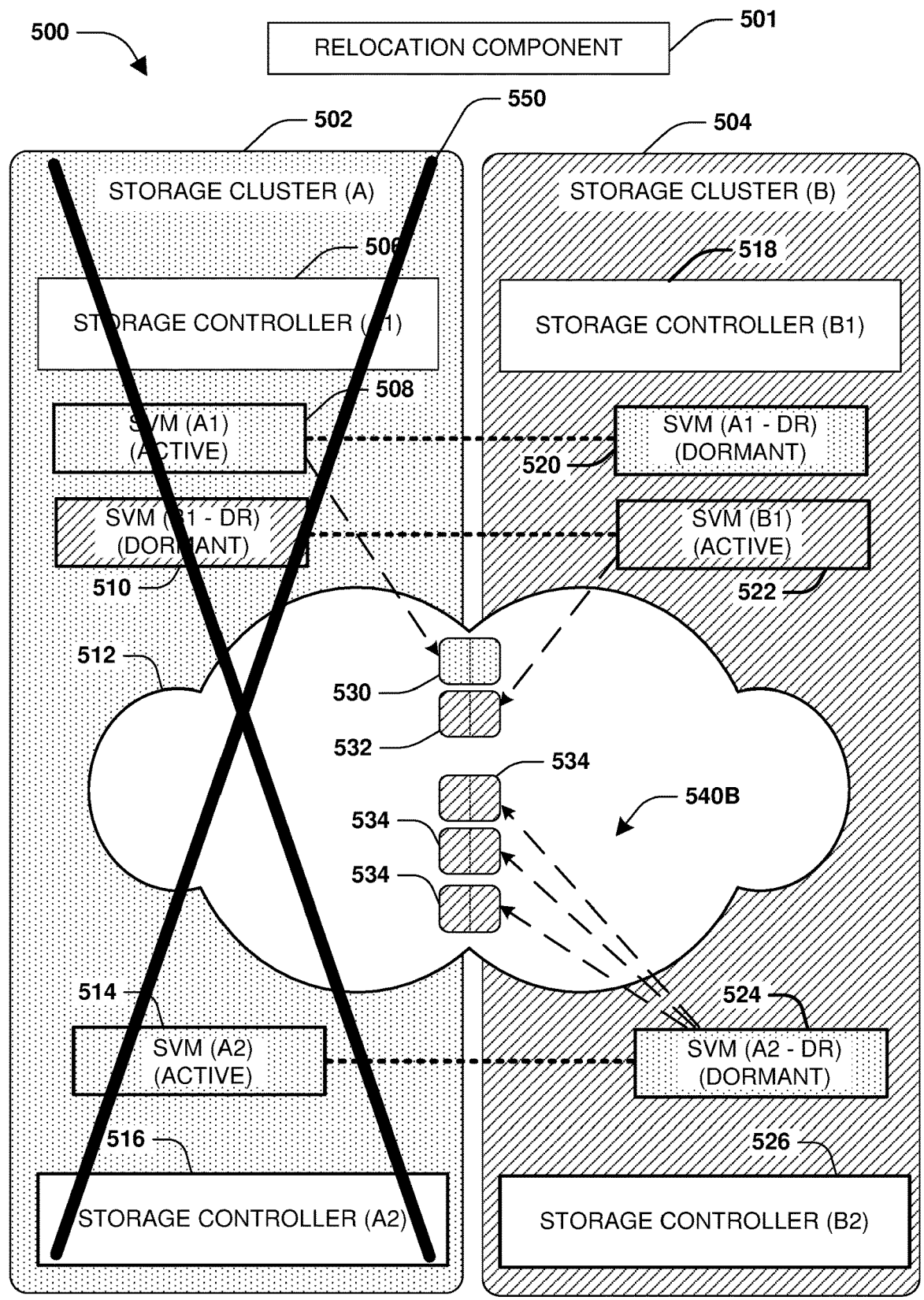
FIG. 5D is a component block diagram illustrating an exemplary system for temporary storage virtual machine relocation between storage clusters at a storage virtual machine granularity in response to a disaster of a storage cluster, where ownership of a storage aggregate (A2) is switched from a storage cluster (A) to a storage cluster (B).
Figure 5E:
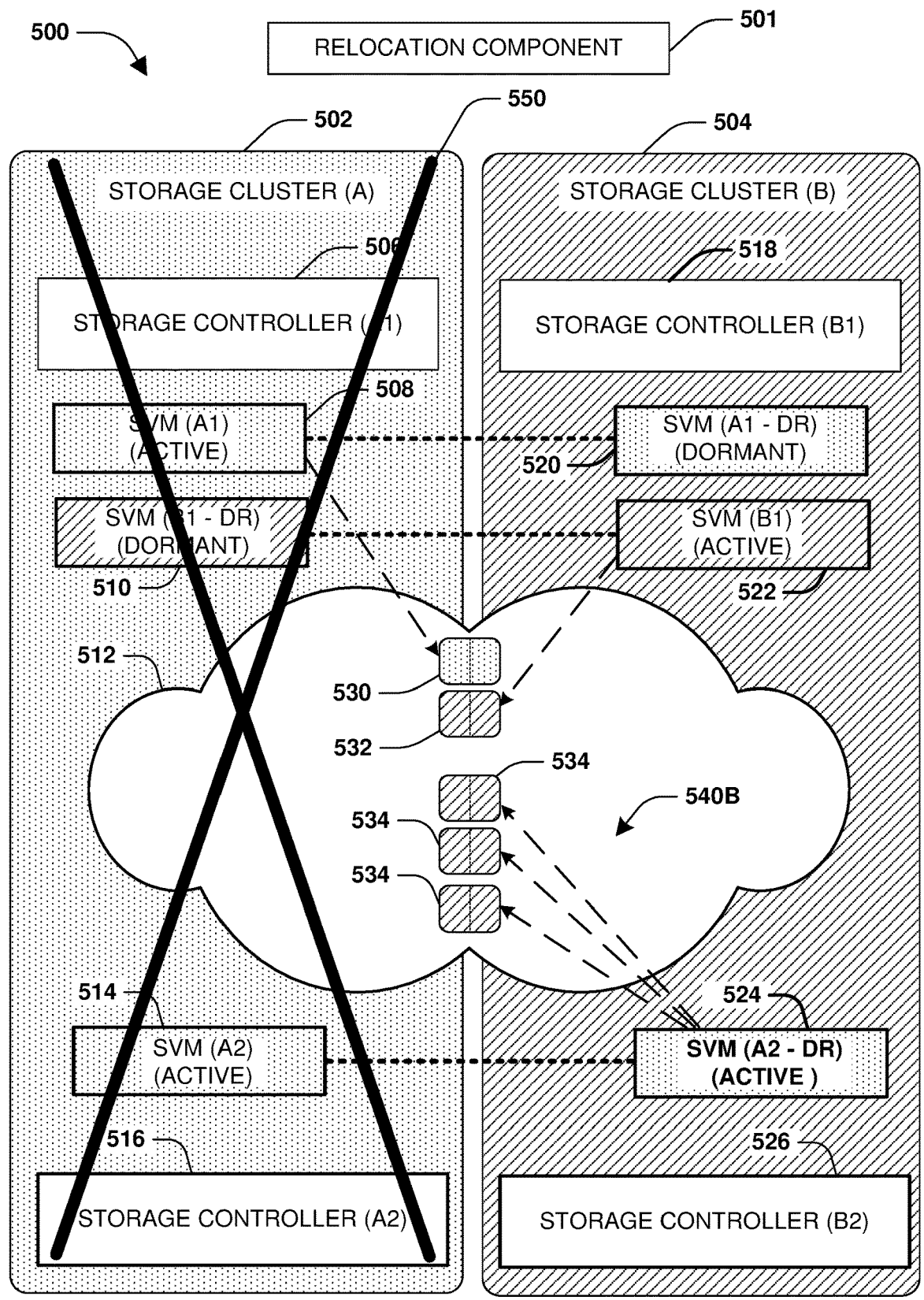
FIG. 5E is a component block diagram illustrating an exemplary system for temporary storage virtual machine relocation between storage clusters at a storage virtual machine granularity in response to a disaster of a storage cluster, where a replicated storage virtual machine (A2-DR) is switched from a dormant state to an active state.

FIG. 5B illustrates a disaster 550 occurring at the storage cluster (A) 502. The storage controller (A2) 516 may be inoperable for providing clients with access to user data through the storage aggregate (A2) of the storage virtual machine (A2) 514 because of the disaster 550. Accordingly, the relocation component 501 may perform a temporary switchover of ownership of the storage aggregate (A2) from the storage cluster (A) 502 to the storage cluster (B) 504 based upon a disaster recovery relationship between the storage cluster (A) 502 and the storage cluster (B) 504. FIG. 5C illustrates the relocation component 501 switching ownership 540B of the second set of storage devices 534 of the storage aggregate (A2) from the storage cluster (A) 502 to the storage cluster (B) 504. FIG. 5D illustrates the relocation component 501 switching ownership of the storage aggregate (A2) from the storage cluster (A) 502 to the storage cluster (B) 504, which is illustrated by the second set of storage devices 534 having the slanted line fill, as opposed to the dotted fill, to illustrate ownership by the storage cluster (B) 504. FIG. 5E illustrates the relocation component 501 switching the replicated storage virtual machine (A2-DR) 524 from a dormant state to an active state (e.g., where the replicated storage virtual machine (A2-DR) 524 may remain to be owned by the storage cluster (A) 502) for providing failover client access to the storage aggregate (A2) that is temporarily owned by the storage cluster (B) 504. In this way, storage virtual machines may be switched over for failover operation to the storage cluster (B) 504 at a storage virtual machine level of granularity, which may improve a recovery time object (RTO) because merely some, but not all, of storage could be switched over in response to the disaster 550, for example.

Figure 5F:
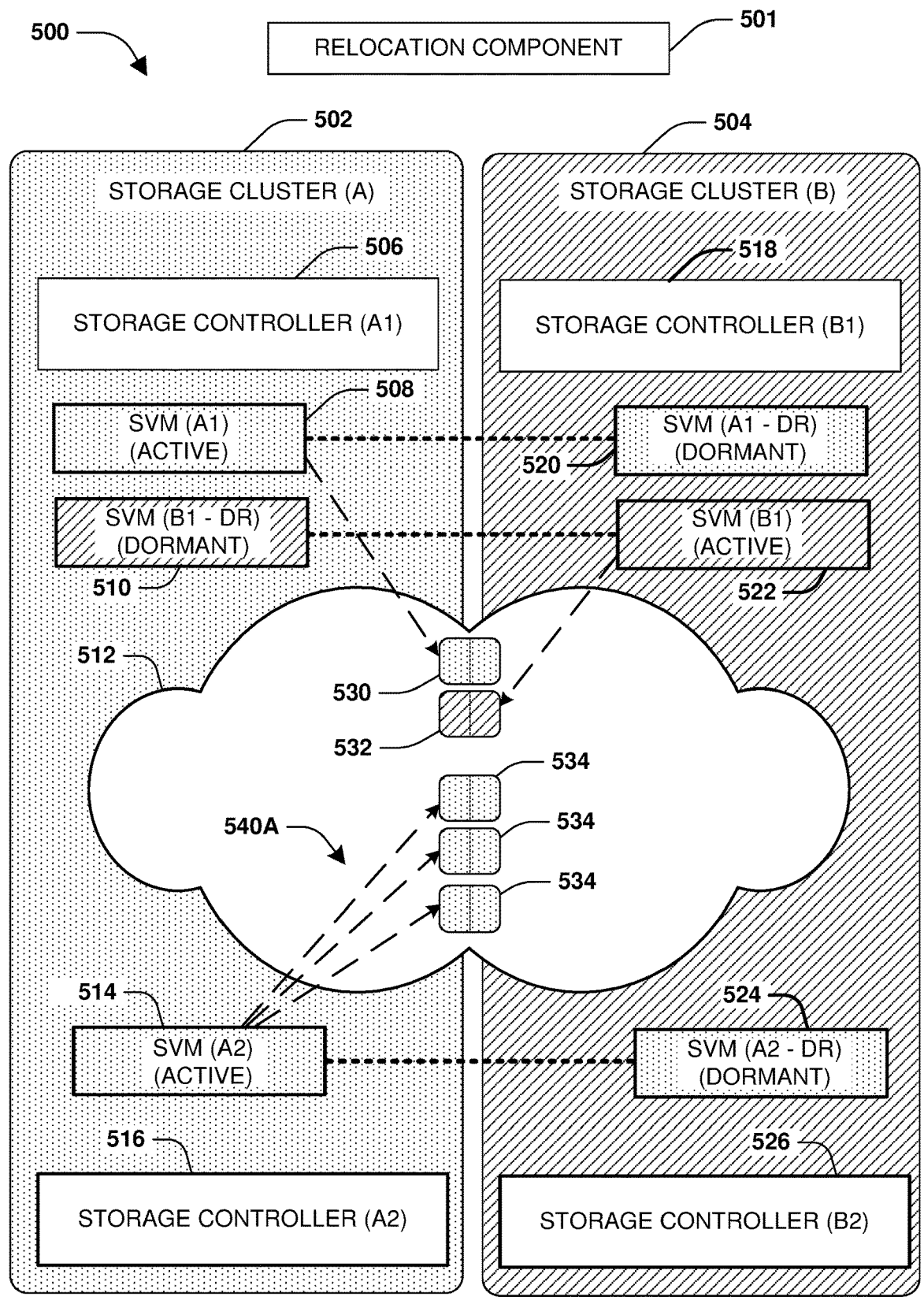
FIG. 5F is a component block diagram illustrating an exemplary system for temporary storage virtual machine relocation between storage clusters at a storage virtual machine granularity in response to a disaster of a storage cluster, where a switchback operation is performed based upon a storage cluster (A) recovering from a disaster.

FIG. 5F illustrates the relocation component 501 determining that the storage cluster (A) 502 has recovered into an operational state from the disaster 550. The relocation component 501 may switch the replicated storage virtual machine (A2-DR) 524 into the dormant state. The relocation component 501 may switch ownership of the storage aggregate (A2) and the second set of storage devices 534 back from the storage cluster (B) 504 to the storage cluster (A) 502. In this way, the relocation component 501 may perform a switchback of ownership to the first storage cluster 502.

Figure 6:
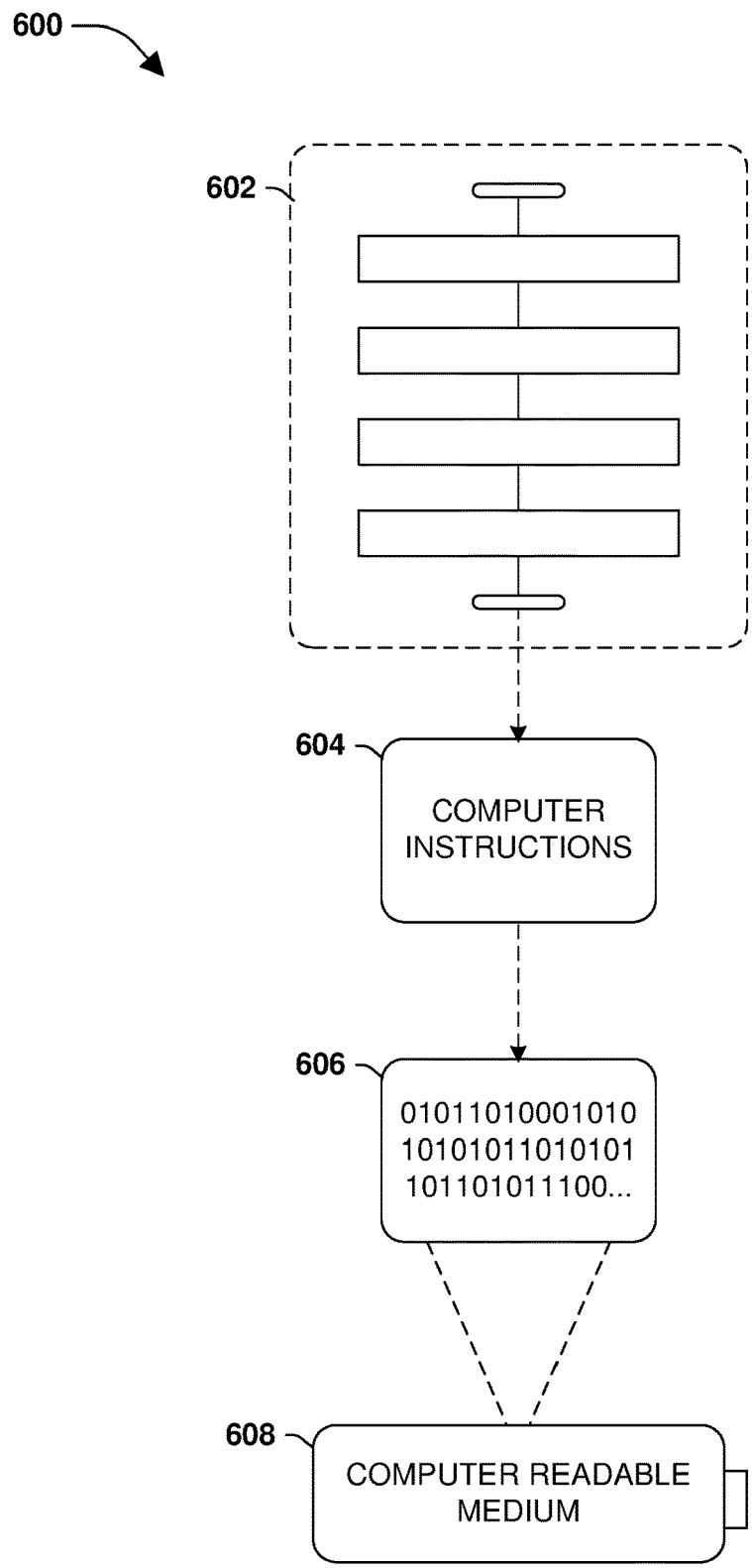
FIG. 6 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 6, wherein the implementation 600 comprises a computer-readable medium 608, such as a CD-R, DVD-R, flash drive, a platter of a hard disk drive, etc., on which is encoded computer-readable data 606. This computer-readable data 606, such as binary data comprising at least one of a zero or a one, in turn comprises a set of computer instructions 604 configured to operate according to one or more of the principles set forth herein. In some embodiments, the processor-executable computer instructions 604 are configured to perform a method 602, such as at least some of the exemplary method 300 of FIG. 3, for example. In some embodiments, the processor-executable instructions 604 are configured to implement a system, such as at least some of the exemplary system 400 of FIGS. 4A-4D and/or at least some of the exemplary system 500 of FIGS. 5A-5F, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard applicationing or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   determining that a first load of a first environment hosting a storage virtual machine (SVM) associated with a storage aggregate is greater than a second load of a second environment comprising a replicated SVM owned and maintained by the first environment as a replication of the SVM;
   transitioning the replicated SVM from a dormant state to an active state and ownership of the storage aggregate, the SVM, and the replicated SVM from the first environment to the second environment, wherein ownership of the SVM located at the first environment and ownership of the replicated SVM located at the second environment is switched from being owned by the first environment to being owned by the second environment; and
   maintaining non-disruptive client access to data through the storage aggregate during switchover of ownership of the storage aggregate, the SVM, and the replicated SVM.

2. The method of claim 1, wherein a plurality of SVMs, including the SVM, are owned by the first environment, and the method comprising:
   switching ownership of the plurality of SVMs of the first environment to the second environment.

3. The method of claim 1, wherein a plurality of replicated SVMs, including the replicated SVM, are owned by the first environment, and the method comprising:
   switching ownership of the plurality of replicated SVMs of the first environment to the second environment.

4. The method of claim 1, wherein a plurality of storage aggregates, including the storage aggregate, are owned by the first environment, and the method comprising:
   switching ownership of the plurality of aggregates of the first environment to the second environment.

5. The method of claim 1, comprising:
   utilizing a zero-copy ownership change operation to switch ownership of the storage aggregate based upon replicated data within local mirror storage.

6. The method of claim 1, comprising:
   unmounting the storage aggregate for changing ownership of a storage device, associated with the storage aggregate, from the first environment to the second environment.

7. The method of claim 1, comprising:
   utilizing a zero-copy ownership change operation to switch the ownership of the storage aggregate based upon replicated data within a mirror storage device comprised within the second environment.

8. The method of claim 7, wherein the mirror storage device is configured as a backup mirror of data stored within a storage device associated with the storage aggregate.

9. The method of claim 1, comprising:
   switching the SVM from the active state to the dormant state.

10. The method of claim 1, comprising:
    specifying that the second environment is a non-temporary owner of the storage aggregate, the SVM, and the replicated SVM.

11. The method of claim 1, comprising:
    permanently changing ownership of storage aggregates and SVMs between the first environment and the second environment utilizing zero-copy ownership change operations based upon load balancing metrics associated with the first environment and the second environment.

12. The method of claim 1, wherein a plurality of storage aggregates, including the storage aggregate, and a plurality of SVMs, including the SVM, are owned by the first environment, and the method comprising:
permanently changing ownership of the plurality of storage aggregates and the plurality of SVMs between the first environment and the second environment utilizing zero-copy ownership change operations based upon load balancing metrics associated with the first environment and the second environment.

13. The method of claim 1, wherein the first environment and the second environment are implemented as software configured to host virtual machines.

14. The method of claim 13, wherein the first environment is hosted within a cloud computing environment.

15. The method of claim 13, wherein the second environment is hosted within a cloud computing environment.

16. A non-transitory machine readable medium having stored thereon instructions, for performing a method, which when executed by a machine, causes the machine to:
determine that a first load of a first environment hosting a storage virtual machine (SVM) associated with a storage aggregate is greater than a second load of a second environment comprising a replicated SVM owned and maintained by the first environment as a replication of the SVM;
transition the replicated SVM from a dormant state to an active state and ownership of the storage aggregate, the SVM, and the replicated SVM from the first environment to the second environment, wherein ownership of the SVM located at the first environment and ownership of the replicated SVM located at the second environment is switched from being owned by the first environment to being owned by the second environment; and
maintain non-disruptive client access to data through the storage aggregate during switchover of ownership of the storage aggregate, the SVM, and the replicated SVM.

17. The non-transitory machine readable medium of claim 16, wherein a plurality of SVMs, including the SVM, are owned by the first environment, and wherein the instructions cause the machine to:
switch ownership of the plurality of SVMs of the first environment to the second environment.

18. The non-transitory machine readable medium of claim 16, wherein a plurality of replicated SVMs, including the replicated SVM, are owned by the first environment, and wherein the instructions cause the machine to:
switch ownership of wherein a plurality of replicated SVMs, including the replicated SVM, are owned by the first environment, and SVMs of the first environment to the second environment.

19. The non-transitory machine readable medium of claim 16, wherein a plurality of storage aggregates, including the storage aggregate, are owned by the first environment, and wherein the instructions cause the machine to:
switch ownership of the plurality of aggregates of the first environment to the second environment.

20. A computing device comprising:
a memory comprising machine executable code; and
a processor coupled to the memory, the processor configured to execute the machine executable code to cause the processor to:
determine that a first load of a first environment hosting a storage virtual machine (SVM) associated with a storage aggregate is greater than a second load of a second environment comprising a replicated SVM owned and maintained by the first environment as a replication of the SVM;
transition the replicated SVM from a dormant state to an active state and ownership of the storage aggregate, the SVM, and the replicated SVM from the first environment to the second environment, wherein ownership of the SVM located at the first environment and ownership of the replicated SVM located at the second environment is switched from being owned by the first environment to being owned by the second environment; and
maintain non-disruptive client access to data through the storage aggregate during switchover of ownership of the storage aggregate, the SVM, and the replicated SVM.

* * * * *